United States Patent [19]

Tsuruta

[11] Patent Number: 5,020,939
[45] Date of Patent: Jun. 4, 1991

[54] IRRIGATION METHOD AND APPARATUS

[76] Inventor: Yasuo Tsuruta, 22-2, 4-chome, Sanno, Ota-ku, Tokyo, 143, Japan

[21] Appl. No.: 262,114

[22] Filed: Oct. 19, 1988

Related U.S. Application Data

[63] Continuation of Ser. No. 786,706, Oct. 11, 1985, abandoned, which is a continuation of Ser. No. 589,689, Mar. 15, 1984, abandoned, which is a continuation of Ser. No. 451,097, Dec. 20, 1982, abandoned, which is a continuation of Ser. No. 147,229.

[51] Int. Cl.$^5$ ............................................. E02B 13/00
[52] U.S. Cl. ...................................... 405/36; 47/48.5
[58] Field of Search .......................... 405/36, 39–41, 405/44–46, 50–52; 47/48.5, 79, 80, 81, 83; 137/391

[56] References Cited

U.S. PATENT DOCUMENTS

| | | | |
|---|---|---|---|
| 1,052,121 | 2/1913 | Austin | 905/44 |
| 3,095,557 | 7/1963 | Clark | 137/391 X |
| 3,754,352 | 8/1973 | Bates | 47/48.5 |
| 4,060,991 | 12/1977 | Reese | 405/36 |
| 4,122,012 | 10/1978 | Vlasnik | 405/52 |

Primary Examiner—David H. Corbin
Attorney, Agent, or Firm—Brisebois & Kruger

[57] ABSTRACT

Method and apparatus for drip irrigation having a water supply tank connected to a constant water level tank by a drain pipe having a drain opening. A supply tube extends from the constant water level tank and is connected to a supply tank with an open top located inside of an air tight casing. The casing contains fillers and has its bottom open to the soil. The system is applicable to irrigate farms and potted plants.

8 Claims, 2 Drawing Sheets

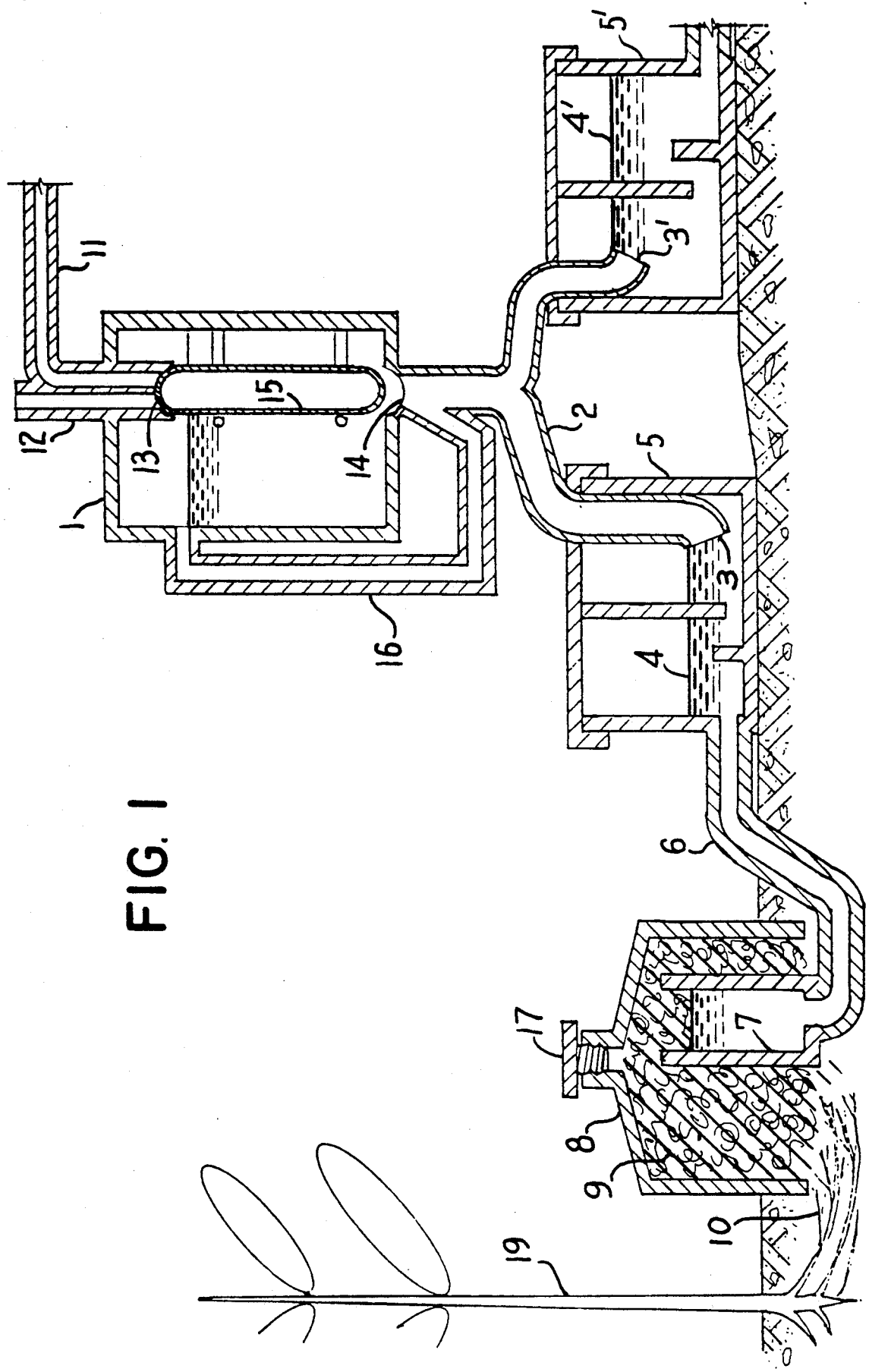
FIG. I

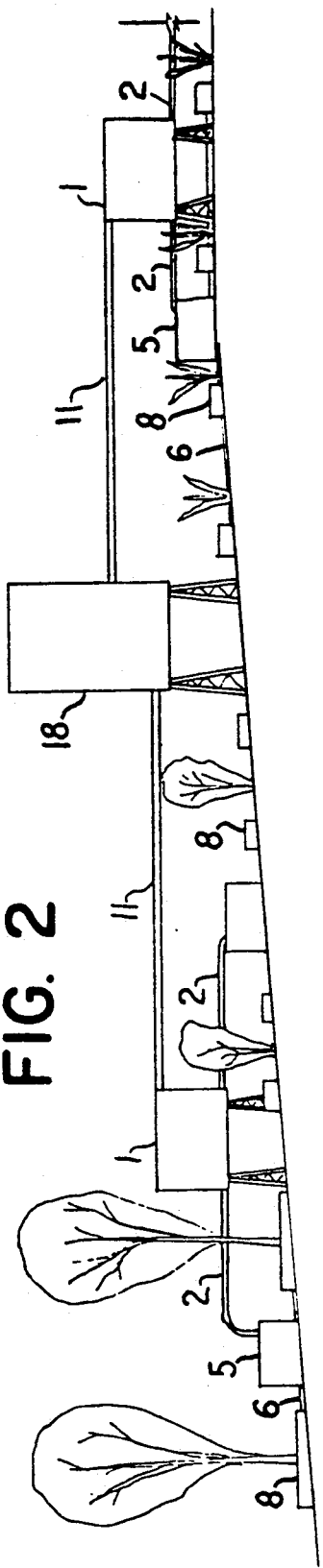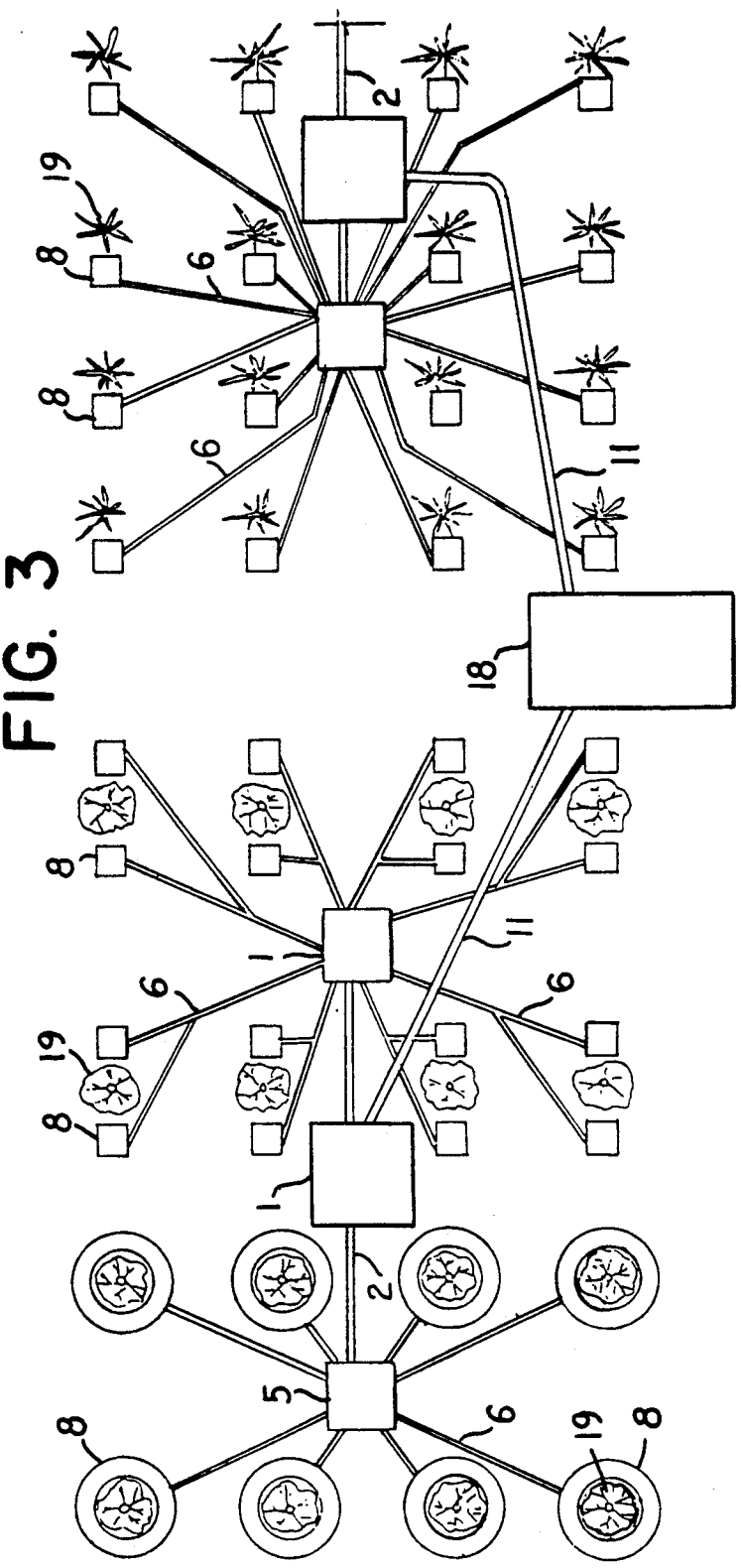

IRRIGATION METHOD AND APPARATUS

This application is a continuation of application Ser. No. 786,706, filed Oct. 11, 1985, now abandoned, which is a continuation of application Ser. No. 589,689, filed Mar. 15, 1984, now abandoned, which is a continuation of application Ser. No. 451,097, filed Dec. 20, 1982, now abandoned, which is a continuation of application Ser. No. 147,229, filed May 6, 1980, now abandoned.

BACKGROUND OF THE INVENTION

Irrigation has been considered as one of the important keys for the maintenance of races since olden days. However, the majority of water secured by hard labor, has been returned back into the soil uselessly.

Recently, dripping methods of irrigation have been used in foreign countries where dry regions occupy the greater part of land. However, since these methods require electric power and special equipment, these methods are employed in limited places.

Miscellaneous devices have been realized since olden days in the effectual utilization of irrigated water in order to maintain the prosperity of races.

However, in order to maintain the population which is increasing day by day, the development of effective irrigated water is now keenly urged in consideration of the limited efficiency of prior irrigated water.

The dripping method of irrigation was practically used for the first time by Symcha Blazs in 1930 and has greened many deserts and barren lands.

However, since the dripping method of irrigation requires flow control equipment, electrical solenoid valves, and timers, it still has problems and troubles unavoidable in such a system and also economical burdens.

SUMMARY OF THE INVENTION

This invention pertains to unique and epoch making methods of irrigation. Since the water supply, in case of this invention, can be provided constantly and employing only the natural disposition of water without using costly and complex electrical equipment, the moisture tension of soil can be changed preventing the vain waste of water.

IN THE DRAWINGS

FIG. 1 is a section showing the water supply system employing a closed water supply tank.

FIG. 2 shows a plane and side view of sloped farm land and the arrangement of the equipment of the present invention.

DETAILED DESCRIPTION

In FIG. 1, the drain openings 3, 3' of drain pipe 2 are fitted to the bottom of a sealed water supply tank 1 and are positioned so as to face the water surface 4, 4' to induce the supply of water from within the water supply tank 1 to the constant level water supply tanks 5, 5' which keep the water surface level at a definite position and which are connected with respective water supply tanks such as 7 by a flexible water supply tube 6.

As shown at FIG. 1, the level 4 of the water in tank 5 is maintained below the level of the upwardly facing outlet of its associated tank or receptacle 7.

Air tight casing 8 has permeable fillers 9 which cover the water supply tank 7 and are in contact with the soil.

The water within the water supply tank 7 is sucked up into the fillers 9 by capillary action and moves to the bottom opening of casing 8 penetrating through the fillers 9 and reaches the root region of plant 10 by infiltration into the soil.

To start irrigation, the exhaust valve 17 is opened to completely fill with water the constant water level tank 5 and to completely fill the casing 8 with water. After the air which existed in fillers 9 is vented through exhaust valve 17, irrigation can be performed by closing exhaust valve 17.

Since the casing 8 is filled with water by the operation described above, the amount of water which moves through fillers 9 can be controlled by the action of a siphon which arises by the head between the water level within the water supply tank 7 and the opening section of casing 8 which is in contact with the soil.

When the water within the water supply tank 7 moves into the soil being sucked into fillers 9, the water level within water supply tank 7 can be maintained at a definite level as the water is supplied to the water supply tank 7 from the constant water surface tank 5 through the tube 6 and therefore, the amount of water which can permeate into the soil from the opening of casing 8 and moves through fillers 9 can be maintained in a definite amount.

When there is a danger that air within the soil could penetrate into fillers 9 in exchange for the water, it is desirous to cut off possible air flow by covering the bottom opening of casing 8 with a water permeable film, for example, moistened paper.

When water within the constant water surface tank 5 is supplied to the water supply tank 7, air enters water supply tank 1 through the drain pipe 2 from the drain opening 3 thereby breaking the balance of head within the water supply tank 1 and thus water drains to the constant water surface tank 5 from the water supply tank 1 until the drain opening 3 is again under the water surface 4.

Thus, the height of the water surfaces 4 and 4' can be adjusted by changing the height of the drain openings 3 and 3'.

In this way, the employment of the irrigating method of this invention, which can soak constantly a definite amount of water directly into the soil from the opening of casing 8, a stable irrigation to the roots without injuring the moisture tension of the soil can be achieved for the first time, and at the same time, the penetrating loss of water deep into the soil and the increase of the salinity of the soil by evaporation of water can be perfectly avoided. Known prior devices pertaining to irrigation cannot achieve such operation.

The amount of water to be supplied to the roots in order to meet the growth of the plant can be controlled by changing the water level 4 and 4' which can be performed in changing the height of the drain openings 3 and 3'.

When the water level within the water supply tank 1 falls by the repetition of draining to the constant water surface tank 5, 5' the buoyancy of float 15 decreases and the float 15 is pressed down by the water pressure in water supply pipe 11 thereby allowing water supply tank 1 to fill from the water supply pipe 11.

As water is supplied to tank 1, the accumulated air within the water supply tank 1 is exhausted through the exhaust pipe 12.

At this moment, the float 15 is lowered to the inlet 14 of drain pipe 2 stopping the flow of water from within the water supply tank 1 towards the drain pipe 2 thereby preventing the water level within the constant water surface tank 5 and 5' from rising.

When the water level within the water supply tank 1 reaches the top of pressure relief pipe 16 by the supply of water from the water supply pipe 11, the float 15 which had been tightly seated at the inlet 14 floats up and the water supply tank recovers the air tightness thus closing the water supply pipe 11 and exhaust pipe 12. Therefore, draining of water to the constant water surface tank 5, 5' can be performed smoothly.

As shown in FIG. 2, water is supplied to the water supply tank 1 composed of plural numbers of tanks by the water supply pipe 11 which extends from the large water storage tank 18. Then draining is made to the constant water surface tank 5 composed of plural numbers of tanks by drain pipe 2 which extends from the water supply tank 1. Then irrigation to the roots of each plant 19 is made by supplying water to the casing 8 in which is embodied the water supply tank 7 from the tube 6 and from the constant water surface tank 5.

In such manner, and by employing one irrigation system composed of a large water storage tank 18 provided as the core, quite natural and efficient irrigation for vast farms can be made employing only the natural disposition of the water and without using additional means such as electric power.

Therefore, even in deserts where conventional methods of irrigation have not been applicable far from a well, harvest can now be possible by the transport of water to tank 18 by the water supply truck at times.

Since the method of this invention can perform drip irrigation directly into the roots of plants, waste of water such as evaporation and loss of water by flow deep into the underground can be perfectly avoided, and the water required for irrigation can be secured by the transport of water from water resources far from the farm.

Applications of the invention are, for example, irrigation for farms which are far from water resources and where underground water is not obtainable. There is labor savings in the cultivation of potted plants, and a ready supply of water is provided for plants in a room as where the family is absent. The filler material 9 used within the casing 8 may be one or more of the permeable-type of substances such as porous resin, glass wool, cotton wool, or rock wool, although porous resin is preferred.

It should be noted that the amount of water introduced into the soil 10 is permeated very slowly from the casing 8, and the rate can be as low as, for example, 0.03 cc/sec., although higher permeation rates are possible. With low permeation rates, salt water can be used to irrigate since the soil 10 will dissociate the salt at such low rates and provided there is some distance between the casing 8 and the roots 19. The concepts of the present invention are to be contrasted with such conventional type systems as illustrated, for example, in U.S. Pat. No. 4,060,991, which rely upon gravitational action rather than as disclosed herein capillary action assisted by the siphon effect. Thus, water moves through filler 9 in casing 8 by means of capillary action and downwardly through the sand in the root zone of plant 19. Saline water can be used as irrigating water because of the desalting action of the sand. phenomenon of soil, especially sandy soil. Correspondingly, water containing a concentration of salts too high to be used for normal irrigation can be used with the irrigation system of this invention.

In view of the foregoing, certain advantages of this invention are believed to be evident. Among these are that the casing 8 is open at the bottom, and therefore, need only extend a short distance into the soil. As a result, only minimal digging is required to install applicant's system, in contrast with prior systems such as that of U.S. Pat. No. 4,060,911, in which virtually the entire system is buried, thereby requiring considerable excavation and digging. A further advantage over U.S. Pat. No. 4,060,991 is that some of the water of that patent is lost by downward permeation into the soil, and it is necessary for the roots of the plant to grow downwardly to the region of the water. In contrast, in accordance with the system of this invention, the water permeates slowly downwardly to the region of the soil where it is used by the roots of the plant. As previously indicated, the capillary action and siphon effect can be adjusted to supply the moisture just at the rate required to supply water to the plant. Correspondingly, waste of water as a result of excessive downward penetration into the soil can be avoided.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. A method of irrigating a plant from a top surface of soil in which the plant is growing, comprising very slowly infusing water into the soil to a root region of the plant from an air-tight casing having an open bottom essentially sealed to the top surface of the soil, said infusing comprising infusing the water into the soil through a filler material within the casing from an upwardly opening outlet of a water supply receptacle in the casing, and supplying water to the receptacle from a water source below the level of said upwardly opening outlet.

2. The method of claim 1 wherein, said infusing comprises, infusing the water into the top surface of the soil at a rate sufficiently low to remove salt from the infusing water in upper regions of the soil above the root region of the plant, and to prevent leaching of such salt from the upper regions of the soil.

3. The method of claim 1, wherein said infusing comprises infusing water at a rate of not more than about 0.03 cc/sec/cm$^2$.

4. The method of claim 1, wherein during irrigating water is fed to the receptacle from a tank in which the level of the water is maintained below the level of the receptacle outlet.

5. Irrigation apparatus for infusing water into a top surface of soil in which a plant is growing to irrigate a root region of the plant below the top surface comprising, a casing having an open bottom sealed to the top surface of the soil, and an airtight upper portion, a receptacle within the casing having an upwardly open outlet, duct means for supplying water to said receptacle to a level below said outlet, a filler material within the casing, said filler material filling the casing and extending into the receptacle outlet at least to the level of the water in the receptacle, and water supply means for maintaining said duct means full of water to prevent air from entering the casing through the duct means and receptacle.

6. Irrigation apparatus according to claim 5 wherein said means for maintaining said duct means full of water comprises a constant level water supply.

7. Apparatus according to claim 5 wherein said apparatus comprises means for infusing water into the soil at a rate not greater than about 0.03 cc/sec./cm$^2$.

8. Irrigation apparatus according to claim 5 wherein said apparatus comprises means for infusing water into the soil at a rate sufficiently low to permit the soil near the casing to absorb salt in the water before the water reaches the root region of the plant.

* * * * *